(12) United States Patent
Larsen (10) Patent No.: US 10,267,286 B2
(45) Date of Patent: Apr. 23, 2019

(54) BELT DRIVE WAVE ENERGY PLANT

(71) Applicant: Weptos A/S, Fredericia (DK)

(72) Inventor: Tommy Larsen, Fredericia (DK)

(73) Assignee: Weptos A/S, Fredericia (DK)

( * ) Notice: Subject to any disclaimer, the term of this patent is extended or adjusted under 35 U.S.C. 154(b) by 338 days.

(21) Appl. No.: 15/101,262

(22) PCT Filed: Dec. 4, 2014

(86) PCT No.: PCT/EP2014/076625
§ 371 (c)(1),
(2) Date: Jun. 2, 2016

(87) PCT Pub. No.: WO2015/082638
PCT Pub. Date: Jun. 11, 2015

(65) Prior Publication Data
US 2016/0305395 A1 Oct. 20, 2016

(30) Foreign Application Priority Data

Dec. 4, 2013 (DK) .................................. 2013 00679

(51) Int. Cl.
| | | |
|---|---|---|
| *F16D 31/02* | (2006.01) |
| *F03B 13/20* | (2006.01) |
| *F03B 13/18* | (2006.01) |
| *B63B 21/50* | (2006.01) |

(Continued)

(52) U.S. Cl.
CPC .............. *F03B 13/20* (2013.01); *B63B 21/50* (2013.01); *B63B 22/02* (2013.01); *B63B 35/44* (2013.01); *F03B 13/1815* (2013.01); *B63B 2035/4466* (2013.01); *F05B 2220/706* (2013.01); *F05B 2240/20* (2013.01); *F05B 2260/4021* (2013.01); *Y02E 10/38* (2013.01)

(58) Field of Classification Search
CPC ...... Y02E 10/38; F03B 13/1815; F03B 13/20; B63B 21/50; B63B 22/02
USPC ...... 60/398; 290/42, 43, 53, 54; 405/76, 224
See application file for complete search history.

(56) References Cited

U.S. PATENT DOCUMENTS

| | | | |
|---|---|---|---|
| 3,928,967 A | | 12/1975 | Salter |
| 4,048,512 A | * | 9/1977 | Wood ........................ E02B 9/08 290/42 |
| 4,122,676 A | | 10/1978 | Kikut |

(Continued)

FOREIGN PATENT DOCUMENTS

| | | |
|---|---|---|
| CN | 201794704 U | 4/2011 |
| CN | 102619669 A | 8/2012 |

(Continued)

OTHER PUBLICATIONS

Search Report issued by Danish Patent Office dated Jul. 3, 2014, for DK Application No. PA 2013 00679.

(Continued)

*Primary Examiner* — Michael Leslie
(74) *Attorney, Agent, or Firm* — Fish & Richardson P.C.

(57) ABSTRACT

A wave power plant (1) comprising: a frame construction (2, 2'), a plurality of rocking rotors (2) arranged on the frame construction (2, 2') on at least on rotor axis (4), a drive axis (30) connected to a generator and journaled in said frame construction (2, 2'); and at least one belt drive connection (40) arranged between the rotor axis (4) and the drive axis (30) for each rocking rotor (3).

25 Claims, 8 Drawing Sheets

(51) Int. Cl.
  *B63B 22/02*   (2006.01)
  *B63B 35/44*   (2006.01)

(56) References Cited

U.S. PATENT DOCUMENTS

| | | | | |
|---|---|---|---|---|
| 4,134,023 | A * | 1/1979 | Salter | F03B 13/181 |
| | | | | 290/42 |
| 4,300,871 | A | 11/1981 | Laithwaite et al. | |
| 4,843,249 | A | 6/1989 | Bussiere | |
| 6,551,053 | B1 | 4/2003 | Schuetz | |
| 6,616,403 | B1 | 9/2003 | Smith et al. | |
| 7,223,137 | B1 | 5/2007 | Sosnowski | |
| 8,536,724 | B2 * | 9/2013 | Dullaway | F03B 13/1815 |
| | | | | 290/53 |
| 8,581,433 | B2 * | 11/2013 | Sidenmark | F03B 13/1815 |
| | | | | 290/53 |
| 8,901,766 | B2 * | 12/2014 | Werjefelt | F03B 13/20 |
| | | | | 290/53 |
| 8,912,677 | B2 * | 12/2014 | Dehlsen | E02B 9/08 |
| | | | | 290/53 |
| 9,267,487 | B2 * | 2/2016 | Larsen | F03B 13/184 |
| 2005/0236841 | A1 | 10/2005 | Henriksen | |
| 2010/0259047 | A1 | 10/2010 | Chi | |
| 2011/0049898 | A1 * | 3/2011 | Larsen | F03B 13/184 |
| | | | | 290/53 |
| 2015/0252777 | A1 * | 9/2015 | Rhinefrank | F03B 13/14 |
| | | | | 290/53 |

FOREIGN PATENT DOCUMENTS

| | | |
|---|---|---|
| DE | 29912809 U1 | 12/1999 |
| DE | 100 35 215 | 3/2001 |
| DE | 102005017040 | 11/2006 |
| FR | 1 049 062 | 12/1953 |
| GB | 1 541 572 | 3/1979 |
| GB | 2 110 763 | 6/1983 |
| GB | 2 279 113 | 12/1994 |
| WO | 2006/060761 | 6/2006 |
| WO | 2008/132550 | 11/2008 |
| WO | 2009/097854 | 8/2009 |
| WO | 2009/097855 | 8/2009 |

OTHER PUBLICATIONS

International Search Report issued by ISA/EP dated Apr. 22, 2015, for International Application No. PCT/EP2014/076625.

* cited by examiner

BELT DRIVE WAVE ENERGY PLANT

BACKGROUND OF THE INVENTION

The present invention relates to a wave power plant for extracting power from the wave movement of a water surface area, the wave power plant being of a type specially suitable for off-shore locations. The invention further relates to a wave energy plant having a plurality of rotors, and which is a floating structure mooring from a single point such as a buoy or the like, such that the wave power plant adjusts to the wave direction.

STATE OF THE ART

Today, many different types of wave power plants are known. All share the feature that they utilise the energy which is provided when water is caused to move in a wave movement, and where a wave causes one part of the device to move relative to another part. Such devices typically utilizes that waves will rock one or more rotor devices arranged in the water surface, and examples are known from e.g. GB 1 541 572, U.S. Pat. Nos. 3,928,967, 4,300,871 and WO2008132550, disclosing rotors of a type usually referred to as "ducks".

Wave power plants intended for off-shore use face the problem that they need to be able to cope with very harsh marine conditions, i.e. a salty environment, that will increase corrosion, and weather conditions that challenges engineering solutions, through extreme temperature differences and extreme mechanical stress on the construction. Further, the off-shore location may make regular service and maintenance difficult and costly. Yet further, in order to obtain an acceptable energy harvest, relative to the investment of locating and maintain the wind power plant in the above mentioned hostile environment, wave power plants will need to rather large structures. The forces acting on such large structures will stress the need for reliable mechanical solution. Thus there is need for very sturdy, stable solutions for any moving parts on such wave energy plants in order to be placed at off-shore locations.

The above mentioned prior art documents disclose rotors of the "duck type". The name comes from the resemblance of the shape of such rotors to the shape of the bird of that name. "Duck type rotors" can be called rocking rotors, because unlike screws and propellers they do not perform complete 360° (or more) rotations, but rotate within an interval around a rest position or neutral position, where the interval is less than 360°, and typically much less. Such rotors have shown to be efficient e.g. in relation to exploiting the energy from waves. In wave power plants using the duck type rotor typically mechanical equipment for transferring motion and/or for transforming motion into useful power (such as electrical power in a generator) is placed inside the duck type rotors, preferably in water tight compartments, in order to avoid deteriorating effects of water on moving parts. Another example of this is WO2009/097854 and WO2009/097855 both disclosing wave power plants having rotors of the duck type arranged on a common axis, and with a free-running mechanism between each rotor and the common axis, and a generator connected to the common axis at an end thereof, and in a watertight, but partly submerged housing.

From power plants utilizing flowing water, such as in rivers, tidal areas and the like, old documents such as U.S. Pat. No. 6,551,053 show power plants with water wheels arranged on separate axes, where rotation of the water wheel axis is transferred to a generator axis via a belt drive, a free-running mechanism arranged between the water wheel and the water wheel axis. Such devices were never intended for off-shore use.

Also known in the art, are wave power plants having floats that are arranged to move up and down in a linear fashion on a vertically arranged beam or tower, the up and down movement being induced by the motion of the wave and/or tide. One example of such a plant is disclosed in US 2010/0259047 A1, where the linear motion is transferred to a rotational via a rope power take up device.

SUMMARY OF THE INVENTION

On this background, it is an object of the present invention to provide an improved wave power plant. Based on the above, it is therefore the object of the present invention to provide a wave power plant of the kind described above and by which an efficient utilisation is provided of the available wave energy. It is a further object of the to provide an improved, more efficient, reliable and robust drive system (power take up, PTO) for converting rotational movement from a rotor of a wave power plant to a generator. It is a further object to provide an improved rotor that allows an improved, more efficient, reliable and robust drive system for converting rotational movement from a rotor of a wave power plant to a generator. It is a further object of the invention to provide a more compact wave power plant. It is a further object to provide an improved mooring system for a wave power plant that allows a simpler more reliable and robust transfer of electrical power from a wave power plant to a sea based cable system. It is a further object to provide a an improved mooring system for a wave power plant, that allows a simpler more reliable and robust anchoring of the wave power plant and allowing it to sway freely.

Some of these objects are achieved in a first aspect of the invention by providing a wave power plant comprising:
  a frame construction;
  a plurality of rocking rotors arranged on the frame construction on at least on rotor shaft journaled on the frame construction;
  a drive axis connected to a generator and journaled in said frame construction; and
  at least one belt drive connection arranged between the rotor axis and the drive axis for each rocking rotor.

Thereby, an improved, more efficient, reliable and robust drive system for converting rotational movement from a rocking rotor of a wave power plant to a generator is accomplished.

In an embodiment the wave power plant has
  at least one rotor drive wheel arranged on or integrated with each rocking rotor; and
  at least one first shaft drive wheel arranged on the drive shaft for each rocking rotor (3).

In a further embodiment the belt drive connection comprises a belt portion having
  a first end connected to the rotor drive wheel; and
  an opposite end connected to the first shaft drive wheel, and wherein said belt portion is arranged to wind and unwind on the rotor drive wheel and first shaft drive wheel.

Thereby a particularly improved, more efficient, reliable and robust drive system for converting rotational movement from a rocking rotor of a wave power plant to a generator is accomplished. A more compact wave power plant may further be obtained because energy is more efficiently transferred from the rocking rotors to the generator.

In a further embodiment a free-running mechanism is arranged between the first shaft drive wheel and the drive shaft. Thereby, the complex parts of a free running mechanism may be kept from being constantly submerged, thereby providing a simpler more efficient and robust wind power plant.

In a further embodiment two belt drive connections may be provided for each rocking rotor. In a further embodiment, relating thereto one belt portion is wound in one direction around a corresponding rotor drive wheel, and another belt portion is wound in the other direction around a corresponding rotor drive wheel relative to the winding direction of first belt portion.

In a further embodiment, additionally a second shaft drive wheel may be connected to each first shaft drive wheel, and a second wire may be attached to each second shaft drive wheel by one end of the second wire and to the rotor drive wheel at a second of the second wire.

In a further embodiment, the belt drive connection may comprise a belt formed by plurality of wires encapsulated in a mantle. The mantle may be formed in polyurethane.

Additionally, in a further embodiment each of the rocking rotors may comprise a substantially cylindrical portion and a tail part, and the at least one rotor drive wheel may be integrated with the rocking rotor and each rotor drive wheel may be formed as a circumferentially running indentation formed in the cylindrical portion and with a hole through the tail part.

In one embodiment said belt drive connection may alternatively comprise a continuous belt.

In all of the previously described embodiments the wave power plant may be a floating structure, having two arms arrangable in an angle to each other (V-shape), each arm comprising a frame construction and a plurality of rocking rotors, and where the wave power plant may comprise a single anchoring point for connecting the wave power plant to a mooring and allowing the wave power plant to sway automatically with respect to a wave direction.

In a second aspect of the invention, some of the objects may be accomplished by providing a rocking rotor for a wave power plant, where said rocking rotor comprises a substantially cylindrical portion and a tail part, wherein at least one rotor drive wheel is integrated with the rocking rotor and formed as a circumferentially running indentation formed in the cylindrical portion and with a hole formed through the tail part.

Thereby, an improved, more efficient, reliable and robust drive system for converting rotational movement from a rotor of a wave power plant to a generator may be accomplished by in a simple, robust way providing a solution for running a belt connection over a large diameter drive wheel thereby also achieving a local gearing in a simple manner The rocking rotor according to the second aspect may be used in a wave power plant according to any one of the embodiments described in connection with the first aspect above.

In a third aspect, some of the objects may be accomplished by a wave power plant, wherein the wave power plant is a floating structure, having to arms arrangable in an angle to each other, each arm comprising a frame construction and a plurality of rotors, and where the wave power plant comprise a single anchoring point for connecting the wave power plant to a mooring and allowing the wave power plant to sway automatically with respect to a wave direction, wherein a drive shaft is journaled in said frame construction, and arranged to transfer rotation from said rotors to a generator arranged in a generator housing on each arm, and where the generator housings are arranged centrally on each arm. Thereby a particularly compact wave power plant may be accomplished.

In a fourth aspect of the invention, some or all of the objects of the invention may be accomplished by a mooring system for a wave power plant comprising an anchor;
a buoy;
a mooring line connecting the wave power plant to the buoy; and
an anchor line for connecting the buoy with the anchor,
wherein the anchor line is rigid and connected to the anchor and the buoy, such that the buoy is prevented from rotating around a longitudinal axis of the rigid anchor line.

In an embodiment of the fourth aspect the mooring line connecting the wave power plant to the buoy is rigid.

In a further embodiment, rotation (swaying) of the wave power plant relative to the buoy is allowed only about a single connection provided at the top of said buoy.

In a further embodiment, the buoy is submerged.

In any of the embodiments of the fourth aspect the wave power plant may be a floating structure, having to arms arrangable in an angle to each other (V-shape), each arm comprising a frame construction and a plurality of rocking rotors, and where the wave power plant may comprise a single anchoring point for connecting the wave power plant to a mooring and allowing the wave power plant to sway automatically with respect to a wave direction.

In any of the embodiments of the fourth aspect, the wave power plant of the mooring system may comprise any of the features recited in respect of the first aspect of the invention mentioned above.

Further, a fifth aspect of the invention provides a wave power plant according to any one of the embodiments described in connection with the first aspect moored from a mooring system according to any one of the embodiments described in relation to the fourth aspect.

Based on the above, it is therefore the object of the present invention to provide a wave power plant of the kind described above and by which an efficient utilisation is provided of the available wave energy.

Further objects, features, advantages and properties of the wave power plant the rocking rotor and the mooring system according to the aspects of invention will become apparent from the detailed description.

BRIEF DESCRIPTION OF THE DRAWINGS

In the following detailed portion of the present description, the invention will be explained in more detail with reference to the exemplary embodiments shown in the drawings, in which.

DETAILED DESCRIPTION OF THE INVENTION

In the following detailed description, a wave power plant according to the invention will be described reference to preferred embodiments.

Wave power plants are also referred to as wave energy converters.

Figure 1:
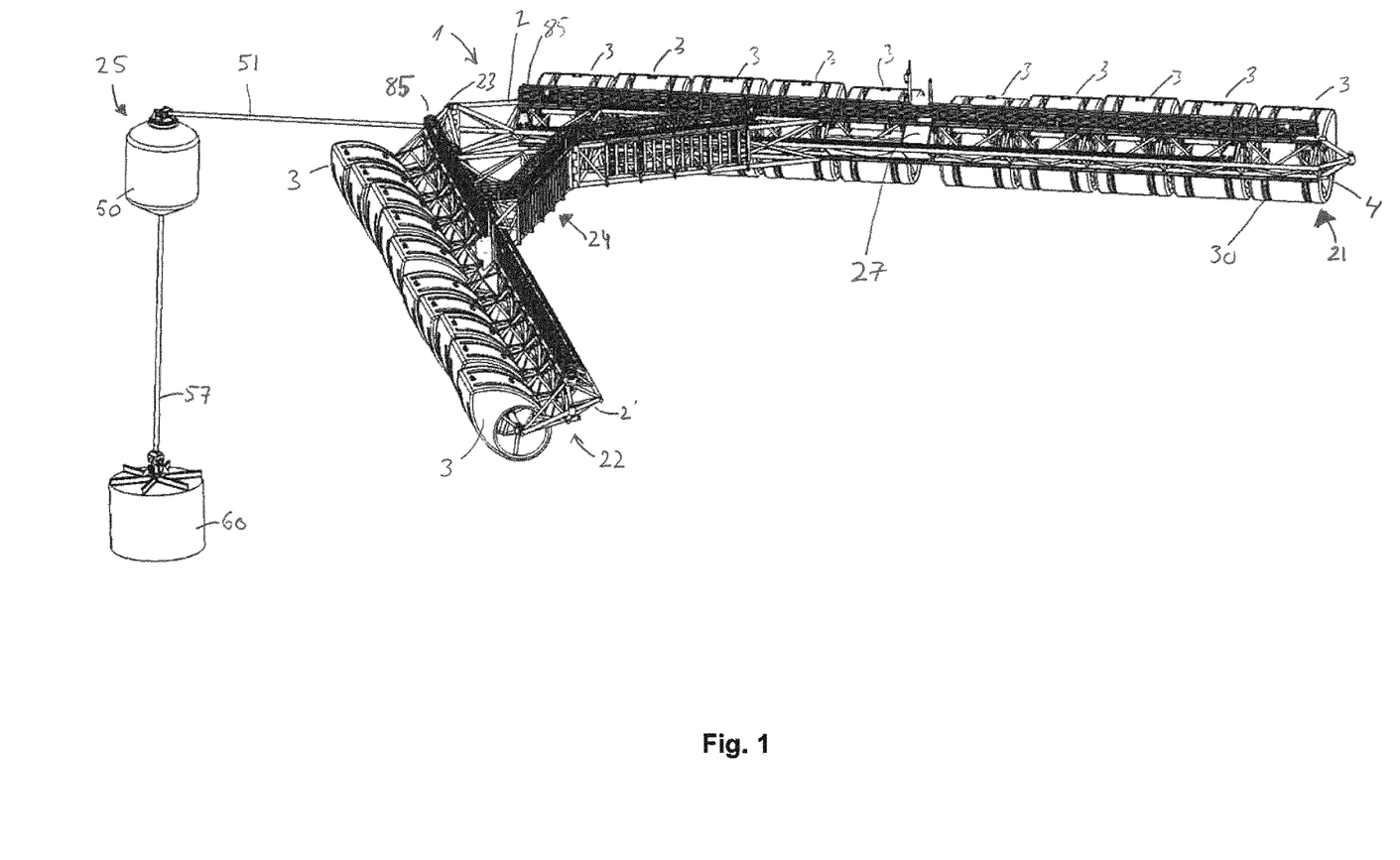
FIG. 1, in a perspective view, shows a wave energy plant according to an aspect of the invention, FIG. 2, in a detailed perspective view of the wave power plant in FIG. 1, and with one rocking rotor removed for showing details of a generator shaft drive mechanism for a wave power plant according to an aspect of the invention.

FIG. 1 shows an embodiment of a wave power plant 1 according to the present invention. The wave power plant 1 is a floating structure. The shown wave power plant 1 has twenty rotors in the form of rocking rotors 3 that—during use—are all partially immersed into the water surface area. The rocking rotors 3 are each arranged on a rotor shaft 4.

Each of the rocking rotors 3 has a buoyancy and a shape which is asymmetrical about the rotor shaft 4 to the effect that, when waves hit the rocking rotor 3, it is forced to rotate first in one direction about the rotor shaft 4 and hence to rotate the rotor shaft, and then in the reciprocal direction, as the wave passes the rocking rotor 3. Thus, the rocking rotor 3 performs a rocking motion relative to a frame construction 2, 2' to which it is connected. This type of rotor is commonly known from e.g. GB patent No. 1 541 572 and U.S. Pat. No. 3,928,967, and is often referred to as a "duck". Such rocking rotors 3 have particularly good properties with regard to output efficiency. Additionally, it will be obvious to the person skilled in the art that according to certain aspects of the present invention as described herein rotors of various configurations may be used, without thereby departing from the fundamental principle on which the invention relies.

Figure 2:
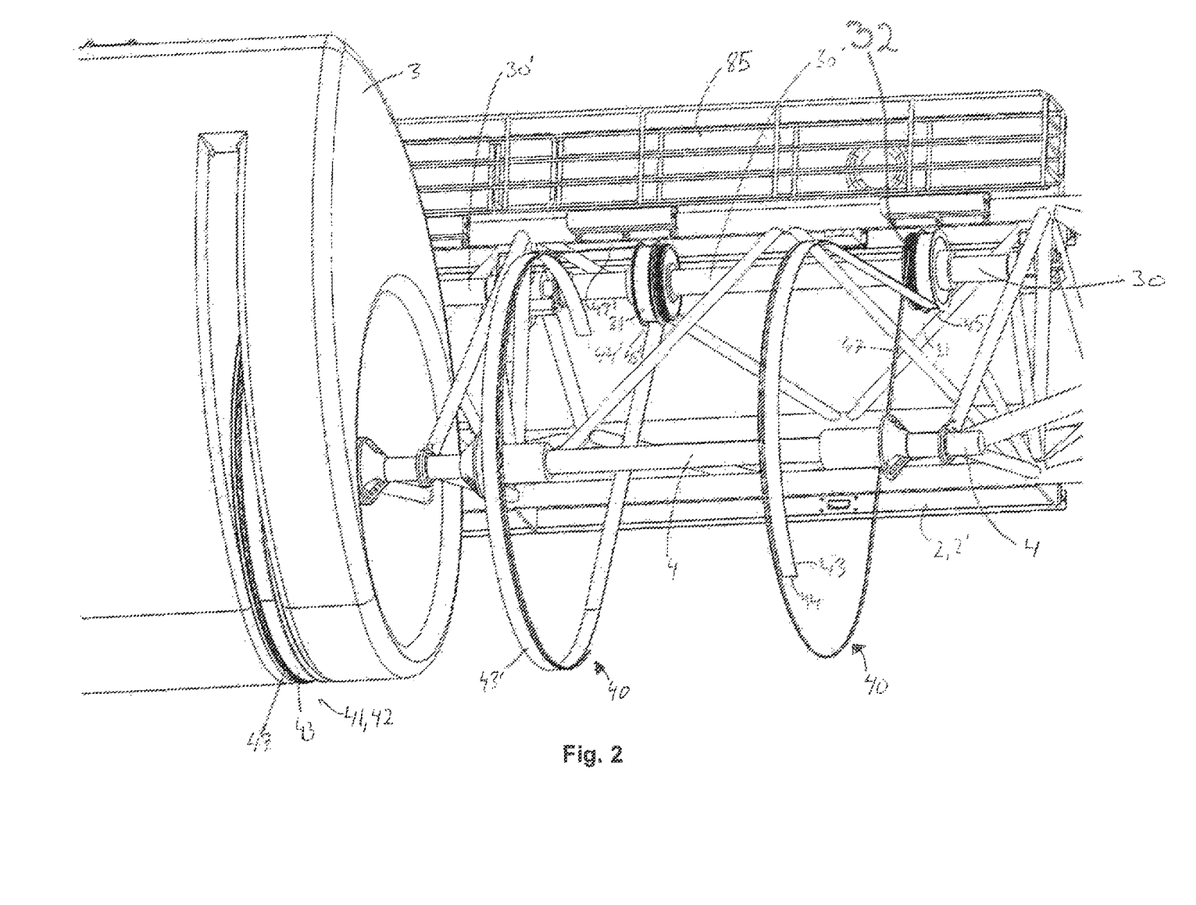

Each rocking rotor 3 is retained rotatable relative to a frame construction 2, 2' of the wave power plant 1 by means of a rotor shaft 4, journalled on the frame construction 2, 2' as shown more clearly in FIG. 2, said frame construction 2, 2' comprising a lattice structure.

Preferably, a plurality of rocking rotors 3 are arranged side by side by attached to a frame construction 2, 2', such that the rotor shaft 4 of each rocking rotor 3 of a frame construction 2, 2' is arranged in extension of each other, i.e. the rotor shafts 4 are coaxially arranged. In the embodiment shown in the figures, all the rocking rotors 3 of a frame construction 2, 2' are arranged on a common shaft or axle 4. However, in other not shown embodiments each rocking rotor may be provided with a separate rotor shaft section, or a subset of rocking rotors may be arranged on an axle/shaft section adapted therefore. In yet further not shown embodiments other types of bearings than shafts/axles may be envisaged, the rocking rotors 3 of a frame construction 2, 2' being arranged to rock (rotate) about the same axis however. Preferably each of the plurality of rotors are freely rotatable or rockable relative to the frame construction 2, 2', and may rock/rotate independently of each other.

Preferably, the rotor shaft 4 is fixed from rotation relative to the frame construction 2, 2', and the rocking rotor 3 having a bearing 72 allowing rotation between the rocking rotor 3 and the shaft 4 and thereby the frame construction 2, 2'. Thereby, the shaft 4 may form a reinforcing part of the frame construction 2, 2', thereby saving further reinforcement structure and thus reducing the weight of the wind power plant, and saving material and thereby also costs.

The wave power plant 1 preferably comprises two elongate, separate arms 21, 21 that are hinged to each other via a hinge 23, each arm 21, 22 comprising a frame construction 2, 2' with a plurality of rocking rotors 3, and the hinge 23 being provided at one end of each of the arms 21, 22. The hinge 23 allows the two arms 21, 22 formed from frame constructions 2, 2' with rocking rotors 3 to be arranged in a V-shape as shown e.g. in FIG. 1.

The two arms 21, 22 may meet in a simple hinge 23 as shown, i.e. such that the hinge provides a single common vertical axis about which the two arms 21, 22 may rotate. Alternatively the two arms 21, 22 may meet in a central hinge unit (not shown) that may comprise a rotational hinge for each arm 21, 22, providing a vertical axis for each of the two arms 21, 22 to rotate about relative to the hinge unit. Such a central hinge unit would be very short compared to the length of the arms 21, 22, such that the two arms 21, 22 can be brought into a V-shape relative to each other, and such that the wave power plant obtains an overall V-shape.

At or in the vicinity the hinge 23 (or at a hinge unit), a single anchoring point 26 for a mooring 25 is arranged. The mooring 25 may comprise a buoy 50 and an anchor part 60, as shown. However, other types of mooring may be envisaged. The single anchoring point allows the wave power plant to rotate freely about the buoy/anchoring site, i.e. the wave power plant may rotate more than 360°. Thereby, the wave power plant may turn passively to adapt to the prevailing wind and wave conditions.

The frame constructions 2, 2' holding the rocking rotors is preferably buoyant such that the axle 4 (or axles) for the rocking rotors—when the wind power plant is in calm sea (no waves)—would be in constant height/depth above/below the sea surface. The rocking rotors will—under such conditions—thus be maintained in a neutral or rest position. Preferably, the rotor shaft/shafts 4 is maintained by the frame constructions at a depth below the water surface.

Figure 7:
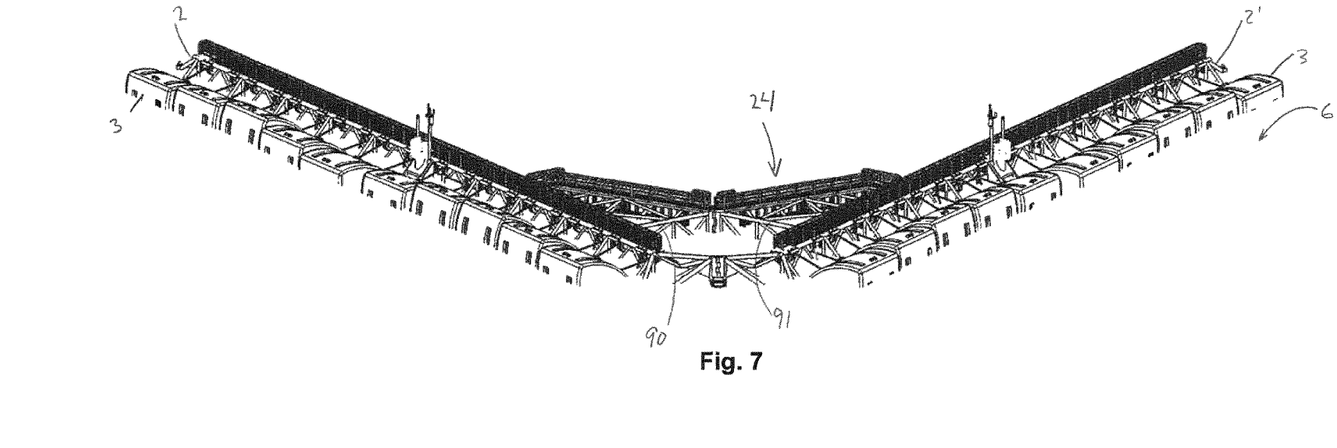
FIG. 7, in a birds eye view, shows the wave power plant of FIG. 1, where it is indicated that the wave power plant is located floating on a water surface area, to indicate an intended use situation the water surface being indicated by the cut-off parts of the wave power plant.
Figure 10:
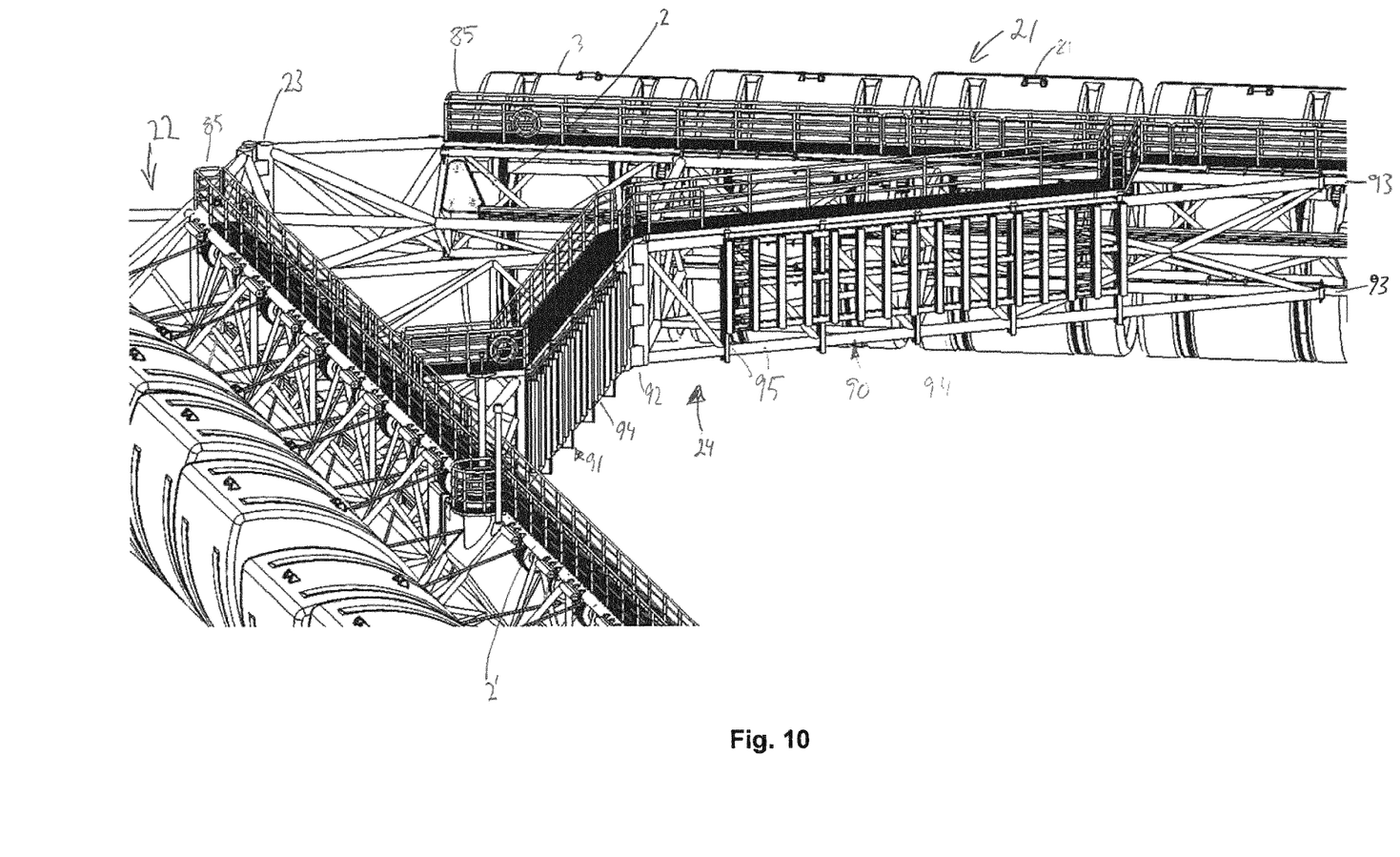
FIG. 10, in a perspective view, shows a detail of the wave power plant shown in FIG. 1, and indicating details of an angle adjustment unit of the wave power plant and with mooring facilities for service vessels and tugboats.

The angle between the two arms 21, 22 may in principle be fixed, but preferably it is adjustable, e.g. by an angle adjustment unit 24 that may be arranged between the two arms 21, 22, as shown in FIGS. 1, 7 and 10, the adjustment unit being arranged to adjust the angle between them. Thereby the two separate arms 21, 22 may be arranged at a mutual angle according to choice. This will allow the angle to be adapted to the wave/weather conditions. Prior to or during a storm, or in expectations of abnormally large waves, the angle between the arms may be minimized to ensure minimal stress on the wave water plant. In very small waves/milder weather conditions, the angle between the arms may be maximized such that a longitudinal axis of the arms is close to perpendicular relative to the wave fronts. Angles in between may be provided in order to obtain optimum harvest of the wave energy under various conditions.

To that end e.g. a linear actuator may in a simple version (not shown) be configured between the two arms 21, 22, such as a hydraulic cylinder or a mechanical spindle. The person skilled in the art will be able to provide different embodiments of drive systems for such linear actuators. Below, other embodiments of an angle adjustment unit 24 will be described.

In some embodiments however, a fixed angle may be provided between the arms 21, 22. The fixed angle may be e.g. 60 degrees and may in this case be obtained by the arms 21, 22 being held in place by transverse booms (not shown) arranged between the arms 21, 22, and extending from one arm to the other.

Thus, according to the present invention the wave power plant 1 is configured, such that it may maintain a desired angle between the arms 21, 22 either at a desired fixed angle or an angle adjustable in relation to conditions (wind and wave direction, weather etc.). The V-shape of the wind power plant 1, in connection with the single mooring/anchoring point 26 provides several advantages. Firstly, the single mooring/anchoring point 26 allows the wind power plant to turn relative to the mooring 25. Secondly, the V-shape causes the wind power plant 1 to turn relative to the wave front such that it is optimally oriented with respect to waves travelling along each of the arms 21, 22 and thereby rock all of the rocking rotors 3 in turn as a wave front pass down the arms 21, 22, whereby a continuous operation of a generator driven by the rocking rotors 3 may be obtained due to an essentially constant influence of momentum transferred from the rocking rotor 3 to the generator (explained below). The V-shape ensures that the rocking rotors 3 are not arranged in each other's wake. The single anchoring point 26 and the V-shape thus allows for automatically adjusting the position of the wave power plant relative to the wave direction. Further, the V-shape will cause objects floating in the water to pass down along the arms 21, 22 rather than amassing in front of the wind power plant 1.

In embodiments, where the angle between the arms 21, 22 is adjustable, the angle may be adjusted to optimize the wind power plant 1 operation to weather conditions. In situations, where smaller to medium waves prevail, the chosen angle may be large, to harvest the full potential of the waves. In rough conditions with large waves a very small angle may be chosen, also to diminish stress between and in the arms 21, 22 and between the rocking rotors and the frame constructions 2, 2' to avoid damages to the wave power plant 1. Further, when the arms 21, 22 are brought into essential parallel configuration, or with a very small angle between them the wave power plant may be easily tugged, or will be in a configuration, where even extremely large waves will simply pass the wave power plant without harming the construction.

A monitoring and control system may be provided to automatically adjust the angle between the arms. The adjustment may be based on collected/sensed information on the generated energy, information from motion sensors representing information on the wave height, e.g. based on the angle between the shaft 4 and the rocking rotors (relative to e.g. to the neutral position of the rocking rotor). Input to the control system may also be provided from weather information systems, and/or remote control by an operator.

Preferably, one half of the rocking rotors 3 of the wave power plant 1 are arranged on one arm 21 of the wave power plant 1 and the other half is arranged on another arm 22.

Figure 6:
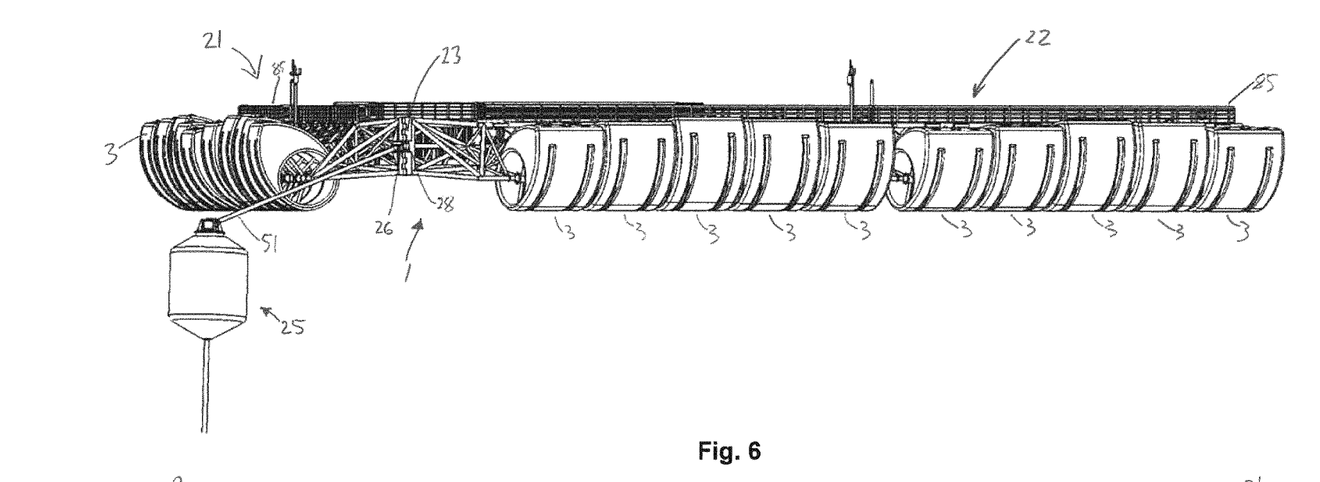
FIG. 6, in a perspective view, shows the wave power plant of FIG. 1 from a different view (from top of the V-shaped wave power plant)

In the exemplary wave power plant 1 shown in FIGS. 1, 6 and 7, ten rocking rotors 3 are arranged on each arm 21, 22. However, fewer or more rocking rotors 3 may be arranged on each arm 21, 22.

As shown, the wave power plant 1 is configured as a floating structure that can be anchored to e.g. a seabed underneath the water surface area 6. To that end a mooring point/anchoring point 26 is arranged, e.g. in the form of an anchorage eyelet 28 for retaining a mooring 25, see e.g. FIG. 6. The anchorage eyelet is arranged at the end of the wave power plant 1 where the distance between the arms 21, 22 is the shortest, or more precisely, where they meet.

The highest output efficiency for wave power plants of this type is achieved when the rocking rotors 3 are immersed so far into the water surface area that the rotor shafts 4 has essentially the same height as the mean wave height in the water surface area 2, see FIG. 7. However, since it is not always the case that the mean wave height is precisely equal to the mean value of the height of the water level at the wave crest and the wave trough, the wave power plant 1 may be configured with one or more ballast tanks (not shown) and pumping facilities (not shown) configured for filling and emptying the one or more ballast tanks with water from the surroundings, with a view to changing the buoyancy of the wave power plant to the effect that it is possible to optimise the output efficiency of the plant in accordance with the current wave conditions. In some embodiments the buoyancy of the wave power plant is pre-calculated so that optimal or acceptable operating/working buoyancy is achieved. In this case the pumping facilities (not shown) may be dispensed of. Ballast tanks may be integrated in or be attached to the frame constructions 2, 2'. According to an aspect of the invention, ballast tanks may be provided in some or all the rocking rotors 3.

The frame constructions 2, 2' of each of the arms 21, 22 further comprises at least one generator drive shaft 30 (may also shortly be called drive shaft), which is journaled on the frame construction 2, 2' and preferably arranged above the rocking rotors 3. Preferably, the drive shafts 30 are arranged on the frame construction 2, 2', such that is kept above the water surface 6 in most operating conditions of wave power plant 1 (splashing from the waves may occur, as well as dipping in the surface due to wave motion). The drive shafts 30', 30 are arranged to transfer motion from the rocking rotors 3 to a generator as described in further detail below. A drive shaft section 30' is associated with each rocking rotor 3. The drive shaft sections 30' are coaxially arranged in extension of each other, and connected to each other such that rotation of one drive shaft section 30' is transferred to the next. Thus, the drive shaft sections 30' connected to each other forms a single drive shaft 30. The drive shaft 30 is connected to drive a generator or a pump or a similar device arranged in a machine housing 27.

A machine housing 27 is arranged on the frame construction 2, 2' of each of the arms 21, 22 and connected to the drive shafts 30 of that arm 21, 22. The machine housing, as shown in FIGS. 1 and 3 is located in horizontal alignment with the drive shafts 30, and preferably such that is arranged above the water surface 6.

The machine housing 27 is an essentially watertight housing, in which the drive shafts 30 are coupled to e.g. a generator, a pump, and/or a gear or other aggregate that can be driven by the momentum that is transferred to the drive shafts 30 from the rocking rotors 3 arranged on the separate frame construction 21, 22, in a manner described below. Thus, it is possible to configure the machine housing 27 with the components that are needed to extract the energy which, via the rocking rotors, are transferred to the drive shafts 30, and, thus, the wave power plant 1 can be used for generating electric current via e.g. a generator or for other purposes, such as for pumping a fluid medium by means of a pump.

Figure 3:
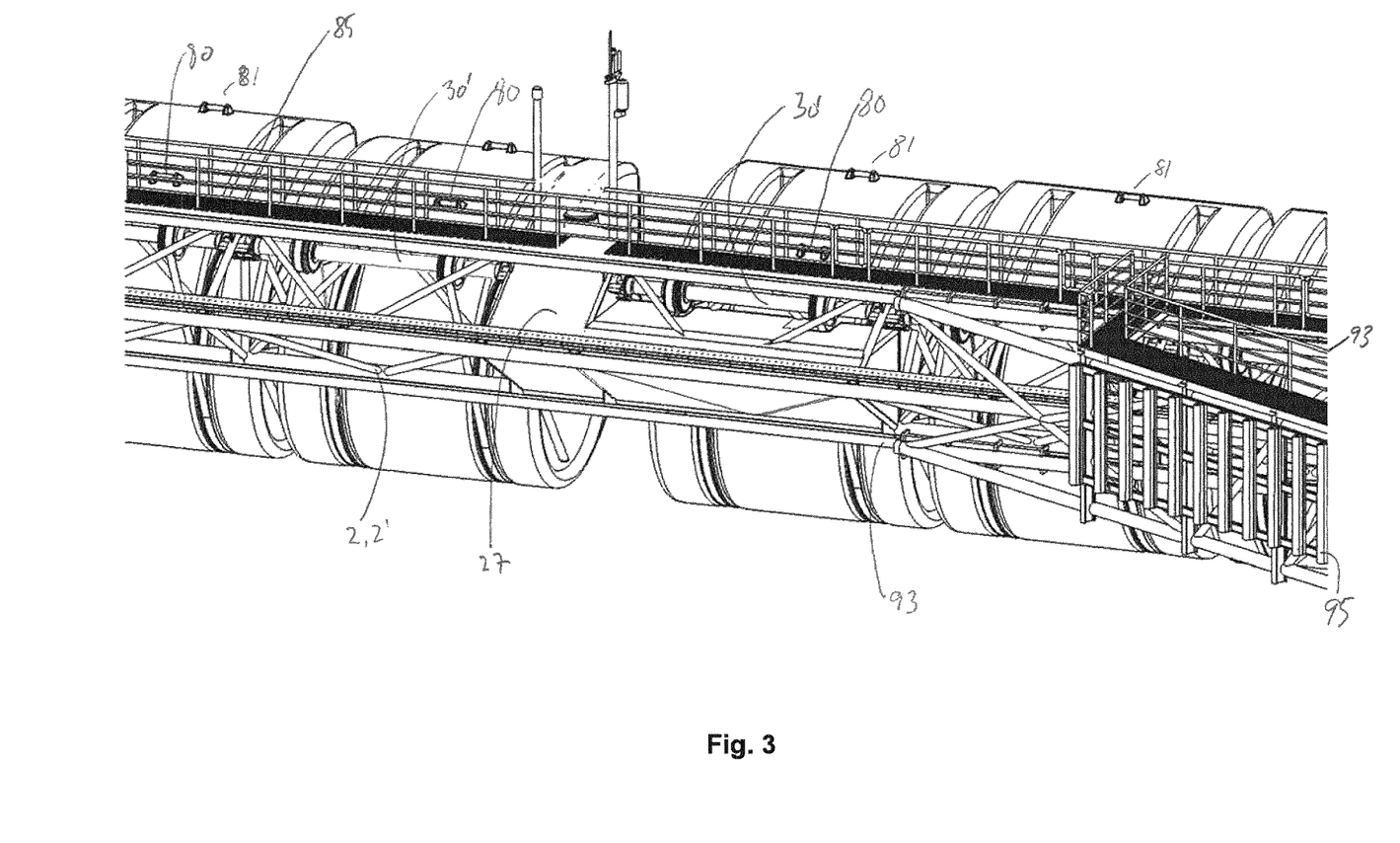
FIG. 3, in another perspective view, shows details a wave power plant as in FIG. 1 and further aspects of the invention.

In a preferred embodiment, and as shown in e.g. FIGS. 1, 3 and 6, a machine housing 27 is arranged centrally on each of the arms 21, 22. By a central arrangement of the machine housings 27, the distance from the farthest rocking rotor 3 is half of the maximum length, and the number of rocking rotors connected to the shaft is also only half the entire number of rocking rotors of an arm 21, 22. The more rocking rotors 3 that are connected to the drive shaft 30 and the longer the drive shaft 30 becomes, the heavier material quality and diameter of the drive shafts 30 are needed. And further the demands on the connection between the generator/gear/pump and the drive shaft 30 increases with the length of the drive shaft and the number of rocking rotors 30 associated therewith. Therefore, arranging the machine housing 27 centrally on an arm allows a reduction of the diameter and quality of the drive shafts 30, thereby reducing the weight of the wave power plant 1 and the manufacturing costs. When the machine housing 27 is arranged centrally on an arm 21, 22 of the wave power plant 1, one drive shaft 30 must extend in each direction from the machine housing 27 in order to connect all the rocking rotors 3. The machine housing 27 may comprise two generators or similar devices, one for each shaft 30, or the machine housing 27 may house a single generator which is adapted for connection to two driving shafts 30, or the generator may be connected to the two shafts via a suitable form of gearing.

It is clear that this aspect of the invention will also function, if the rotors are of a different type than rocking rotors 3, e.g. water mill wheels, paddle wheels, etc.

In other embodiments (not shown) two or three machine housings 27 may be arranged on each arm 21, 22 and regularly distributed along the length of the arm 21, 22, to reduce the lengths of the drive shafts 30.

In yet other embodiments (not shown) a single machine housing 27 may be arranged in other locations on each arm 21, 22, such as preferably at the end where the hinge 23 is located.

In connection with all embodiments pertaining to the machine housing 27, and where the machine housing 27 houses one or more electrical generators, a suitable electrical cable (not shown) or set of electrical cables (not shown) may electrically connect the generator(s) with the mooring 25 via the anchoring point 24.

Rotational or rocking motion is transferred from each of the rocking rotors 3 to the drive shaft section 30' associated with the individual rocking rotor 3 via at least one chain drive or more preferably a wire drive or even more preferably one or two belt drive connections 40 per rocking rotor 3. The belt drive connections 40 will be explained in connection with FIG. 2, in which a part of an arm 21, 22 with a portion of a frame construction 2, 2' is shown. The FIG. 2 shows a stretch/section of such a frame construction 2, 2' having two rocking rotors 3. However, in order to explain the belt drive connections 40 in more detail one of the rotors is not shown, to show details of the belt connection 40 related to the not shown rocking rotor 3.

The belt drive connection 40 in all embodiments comprises at least one rotor drive wheel 41 connected to or forming an integrated wheel portion, or wheel track 42 on the rocking rotor 3 and one first shaft drive wheel 31 formed on the drive shaft section 30'. Since the rocking rotors 3 perform an alternating or reciprocating rotational movement when influenced by the waves, a free running mechanism (not shown) may be provide between either the rocking rotor 3 and the rotor drive wheel 41, or between the first shaft drive wheel 31 and the drive shaft 30, in order to let the drive shaft 30 only be influenced to drive in one rotational direction. Such a free running mechanism (not shown) may be of the ratchet and pawl type, or any other suitable means known in the art. The free running mechanism (not shown) is preferably provided between the first shaft drive wheel 31 and the drive shaft 30, such that the free running mechanism (not shown) is kept from being constantly located under the surface of the water 6 on which the wave power plant is floating.

Thereby, the task of protecting the free running mechanism (not shown) from salty seawater becomes easier. This will lower the manufacturing costs and provide a simpler construction. When the free running mechanism (not shown) provided between the first shaft drive wheel 31 and the drive shaft 30, the rotor drive wheel 41 may be formed as rigidly connected wheel on the rocking rotor 3 or as an integrated portion of the rocking rotor 3, in such a manner that the rotor drive wheel 41 rocks/rotates with the rocking rotor 3.

The belt drive connection 40 may in a simple form (not shown), and in one aspect of the invention, comprise a continuous belt suspended between the rotor drive wheel 41 and the first shaft drive wheel 31. In an embodiment of this aspect, there may be arranged two drive belt connections 40 between each rocking rotor 3 and the associated drive shaft section 30'. The one of the belt drive connection 40 may be crossed to allow to influence the drive shaft 30 to rotate in the correct direction when the rocking rotor 3 reciprocates.

In a preferred aspect of the invention the drive belt connection comprises a belt portion 43, 43' of an appropriately chosen length, i.e. the belt 43, 43' comprises two opposite ends 44, 44'; 45, 45' which at one of the ends 44, 44' is fixedly connected to the rotor drive wheel 41, 42, and the opposite end 45, 45' is fixedly connected to the first shaft drive wheel 31. In FIG. 2, a portion of the belt portion 43, 43' is rolled up on the first shaft drive wheel 31, whereby the end 45 belt portion 43, 43' is not directly visible, because the end 45, 45' is located under a stretch of the belt portion 43, 43'. In an embodiment of this aspect, and as shown in FIG. 2, two belt portions 43, 43' and two rotor drive wheels 41, 42 are arranged in connection to each rocking rotor 3. One of these belt portions 43 allows for activating the drive shaft 30 for rotation in the desired direction, when the rocking rotor 3 rocks/rotates in one direction relative to shaft 4, and the other belt portion 43' allows for activating the drive shaft 30 for rotation in the desired direction (the same direction), when the rocking rotor 3 rocks/rotates in the opposite direction relative to shaft 4, by being wound up on the rotor drive wheel 41, 42 in the opposite direction than the first belt portion 43. Thereby both direction of motion of the rocking rotor may be utilized for rotating the drive shaft 30 in the same direction.

Preferably, the belt portions 43, 43' are formed as a belt, i.e. having a width considerably larger than a thickness (as seen in a cross section). In other embodiments (not shown) however, a wire may be used. It is an advantage of the belt version, that a belt can obtain a considerable strength having a rather thin profile, relative to a cable, which will allow the belt 43, 43', or at least a portion thereof to be wound up on the drive wheels 41, 42; 31. In other embodiment the belt 43, 43' may be replaced by two, three or more thinner wires, arranged in parallel on the drive wheels 41, 42; 31, such as e.g. 20, 30 or 40 wires. However, in a preferred embodiment the belt 43, 43' is formed by a plurality of parallel steel wires encapsulated in a flat polyurethane mantle. Other types of mantle materials are conceivable. The advantage of the polyurethane mantle is that it is strong and will be strengthened and guided by the plurality of wires encapsulated, while protecting the wires from the often saline seawater. By a plurality of wires encapsulated is meant 2-100 such as 2-50, such as 2-30, such as 2-20. Thus a very simple, reliable and robust transfer of rotation from the rocking rotors 3 to the drive shaft 30 is obtained. An advantage of the belt portion 43, 43' attached at each end to the respective drive wheels, over a continuous band is that a continuous band needs a very high pre-tensioning in order not to slide over the drive wheels or otherwise the continuous band need to be toothed, either of which will increase the wear on all involved parts considerably. Further, the pre-tension needed for very large size rocking rotors 3, would require considerable reinforcement of the frame construction 2, 2', and drive wheel bearings etc. considerably increasing the complexity, the weight, and the manufacturing costs of the wave power plant 1.

In a preferred embodiment, and as shown in FIG. 2, the band drive connection 40, further comprises a second wire 47, 47'. The second wire 47, 47' aids in pulling the belt portion 43, 43' on the wire wheels 41, 42; 31 when the motion of the rocking rotor 3 reciprocates. This solution requires a second shaft drive wheel 32, for each of the first shaft drive wheels 31. The first and second shaft drive wheels 31, 32 are coupled to rotate in the same direction on the drive shaft 30. The second wires 47, 47' each have two opposite ends which at one of the ends 44, 44' is fixedly connected to the rotor drive wheel 41, 42, (but wound in an opposite direction than the belt portion 43, 43') and the opposite end is fixedly connected to the second shaft drive wheel 32 (but wound in an opposite direction than the belt portion 43, 43' on the corresponding first shaft drive wheel 31). In FIG. 2, a portion of the wire 47, 47' is rolled up on the second shaft drive wheel 32, whereby the end mounted on the drive wheel is not directly visible, because the end is located under a stretch of the wire 47, 47'. The wire 47, 47' may be a single steel wire, which is much thinner than the width of the band portion 43, 43'. In other embodiments two parallel steel wires may be used. Use of two wires would add security if one breaks. In some embodiments the wire or wires may be encapsulated in a polyurethane mantle or similar. In further embodiments the wire 47, 47' may be replaced by a band/belt similar to band portion 43, 43' described above, however in much smaller dimensions.

The belt/wire arrangements disclosed above has surprisingly been found to level out the rotation of the drive shafts 30 despite that they have a slight breaking effect on the rotation. Surprisingly, by simulations it has been found that this levelling out of the shaft rotation will result in that up to half of the rocking rotors 3 may be left out in order to obtain the same power output from the wave power plant, resulting in a decrease in size, weight, and materials use.

In an embodiment the two shaft drive wheels, first shaft drive wheel 31 and second shaft drive wheel 32, of a set of drive wheels may be rotational relative to each other and be provided with a spring mechanism (not shown) between the two, and limiting the relative rotation The not shown spring mechanism may be of any suitable type. The spring mechanism is provided between the first and the second shaft drive wheels 31, 32 in order to tension the belt 43 and/or the wire 47. This may be used to tension the belt 43 and or the wire 47 during manufacture, and may be used to counter a weakening of the belt 43 and/or the wire 47. Thereby, the time between repairs and replacements may be prolonged.

Figure 5:
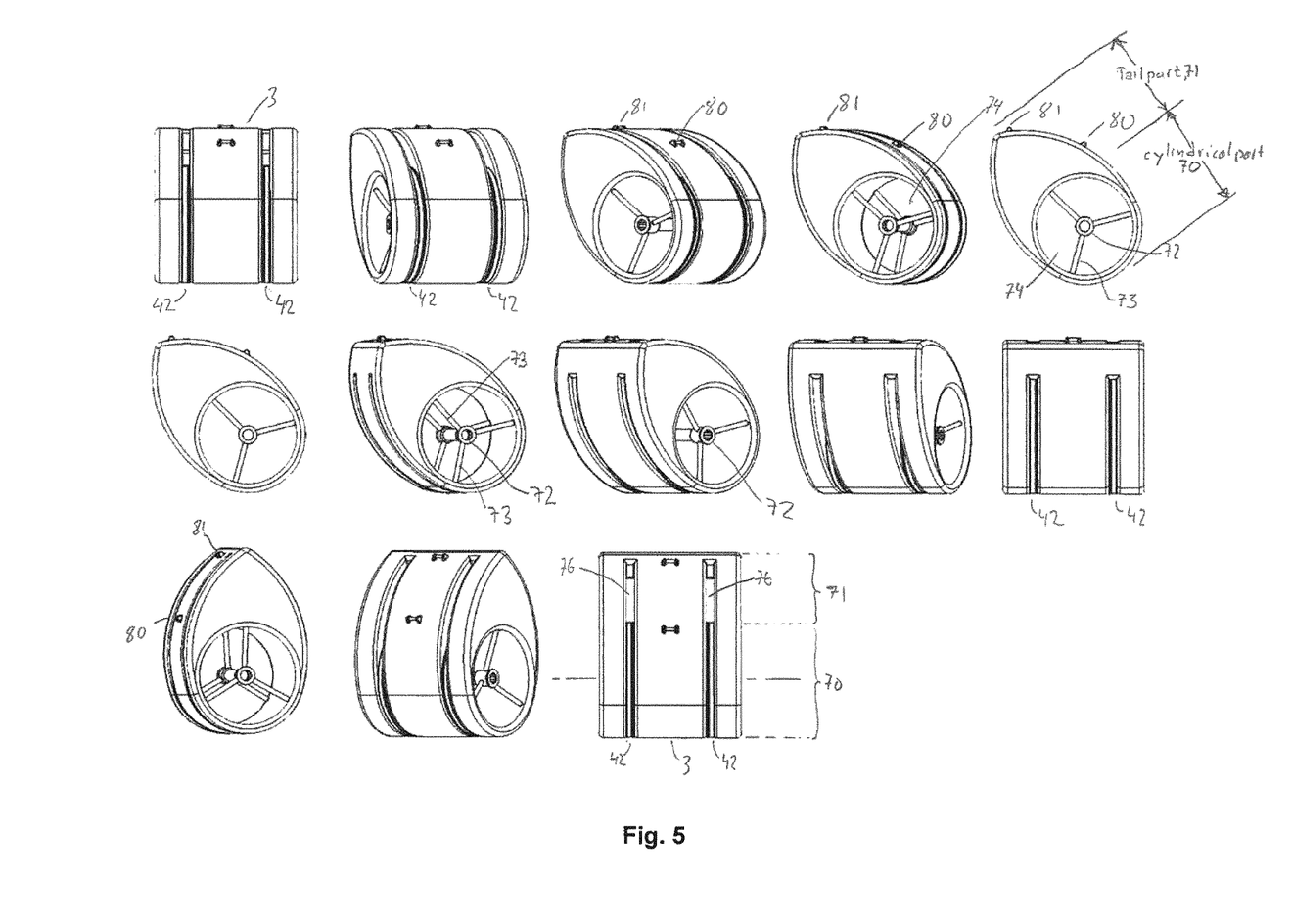
FIG. 5, in various perspectives, shows a rocking rotor of the "duck" type, for use in a wave power plant as shown in FIG. 1, and according to a further aspect of the invention.

Referring now to FIG. 5, the rocking rotors 3 comprises a substantially cylindrical part 70 and a tail part 71. In order to balance the buoyancy a portion 74 of the cylindrical part may be cut out, such that a cylindrical void is arranged in the centre of the cylindrical part 70 of the rocking rotor 3. The rotor shaft 4 (not shown in FIG. 5) may be arranged on an inner cylindrical bearing part 72 supported by spokes 73. The cut out portion will decrease the weight of the rocking rotor 3. The rocking rotors may be made in steel, or they may be shaped in concrete, such as reinforced concrete. Also, the rocking rotors may be formed in a composite material. In any case the type of material chosen should be able to withstand saline water conditions. The tail part 71 may be solid, or it may be hollow. The tail part may be used as a ballast tank. In other embodiments (not show), the cylindrical part 71 may not have a cut-out cylindrical portion/void 74. The cylindrical part 71 may in this case be solid, or it may be hollow, and the cylindrical part 71 may in the latter case be used as a ballast tank.

As can be seen in the rightmost view on the lower row of views of the rocking rotor 3 in FIG. 5, the rotor drive wheels 41 on the rocking rotor 3 of also FIG. 2, may preferably be formed as integrated wheel portions 42 on the rocking rotor 3, the integrated wheel portions 42 (two of them) extending on the substantially cylindrical part 70 of the rocking rotor 3. The integrated wheel portions 42 are formed as slight indentations into the outer surface of the cylindrical part 70 over most of the cylindrical part 70 and via through going holes 76, 76' through the tail part 71.

The rotor drive wheels 41 on the rocking rotor 3 being formed as integrated wheel portions 42 as slight indentations as described above, allows a simple way of providing very large rotor drive wheels 4 on the rocking rotor 3. The relative size difference between the integrated rotor drive wheel portions 42 and the first shaft drive wheel 31 allows an efficient gearing "locally" at each rotor. Thereby, potentially a gearing in connection with the generator may be dispensed of, or downsized.

Figure 4:
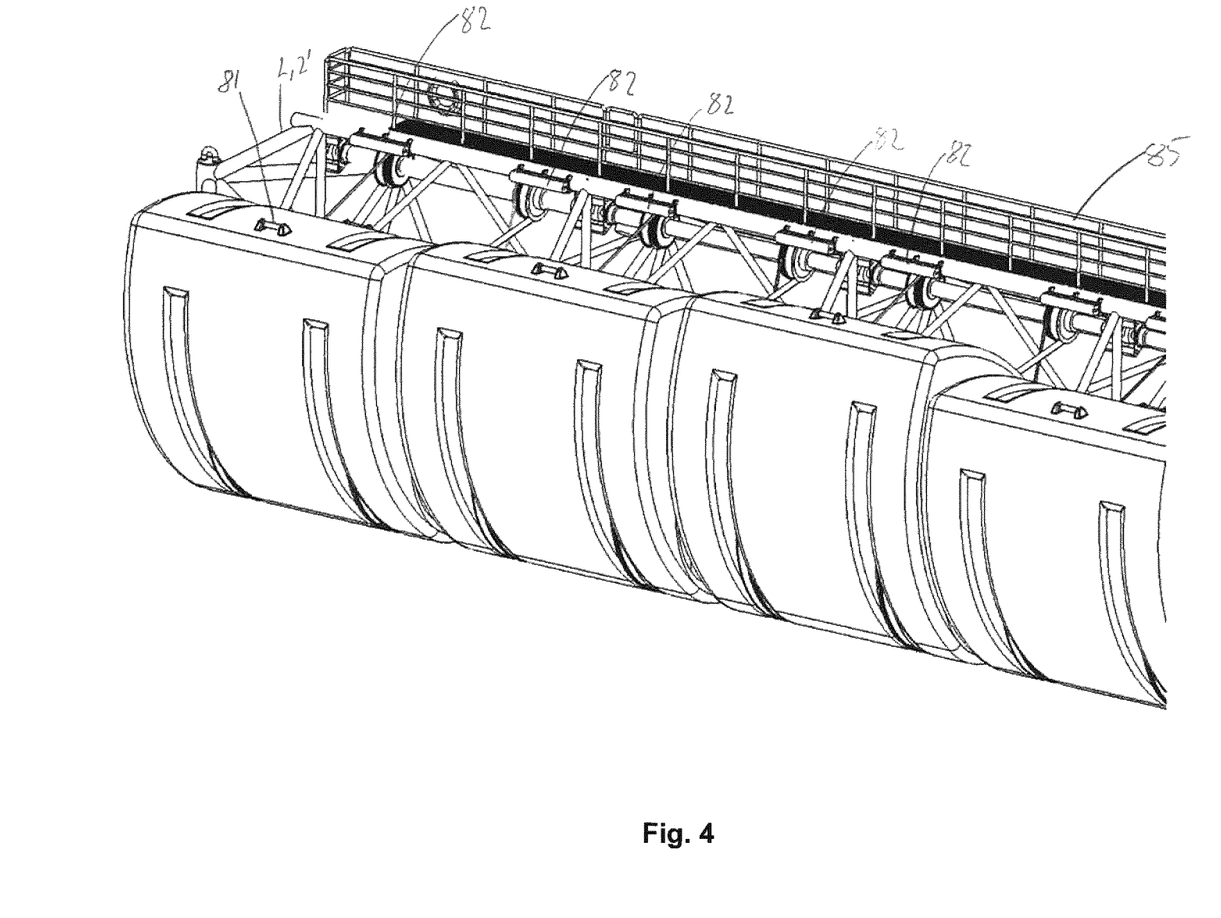
FIG. 4, in a perspective view, shows further details a wave power plant as in FIG. 1 according to a further aspect of the invention.

On each of the rocking rotors 3, a first and a second handling bar 80, 81, may be provided. A gangway 85 may be provided at an upwardly facing part of the frame constructions 2,2'. A good view of the gangways 85 on each of arms 21, 22 can be seen in FIGS. 6 and 7 and a close up can be seen in FIGS. 3 and 4. Referring, to FIGS. 3 and 4 the first handling bar 80 may be reachable from the gangway 85. Thereby, a rope, chain, wire or the like may be attached to the first handling bar, and the tail 71 of the rocking rotor 3 may thereby be pulled out of the water. Once the tail 71 has been lifted out of the water, the rocking rotor 3 is thus disengaged because the waves cannot any longer rock the rocking rotor 3 (at least in calm conditions). When in this position the second handling bar 81 becomes in reach of the gangway 85. Thus a rope, chain, wire or the like may be attached to the second handling bar 81, and the tail 71 of the rocking rotor 3 may be secured to the frame construction in a disengaged position (with the tail 71 pointing upwards). This may be used when the wave power plant 1 needs service, or during transport of the wave power plant 1. As is visible in FIG. 4 two paddings or fenders 82, 82' are provided on the frame construction 2, 2' for each rocking rotor 3, an unpadded portion 83 in between each pair of paddings or fenders 82, 82'.

Thereby the tail 71 of the rocking rotor 3 can be brought in the above mentioned transport and service position, without causing damage to the frame construction 2, 2' or the tail 71 of the rocking rotor 3.

In the embodiments shown in the figures, the wave power plant 1 is formed as single unit having the two angled arms 21, 22 as described above. However, in not shown embodiments the frame constructions 2, 2' of each of the arms 21, 22, may be formed in sections or modules, each section or module comprising one or more rocking rotors 3. Thus the length of an arm 21, 22 may be adjusted by adding or removing a section or module.

The ends of the sections or modules may thus be adapted for connection to a neighbouring section or module. At least a drive shaft of each module may be connectable to the drive shaft of a neighbouring section or module. However, in some embodiments the rotor shafts of the sections or modules may also be connectable for increased stability.

Each of the sections or modules will comprise a frame constructions 2, 2', e.g. with a lattice structure similar to what is described above, and with one or more rocking rotors 3. Each section or module may be provided with ballast tanks as described above.

Now referring to FIGS. 1, 7 and 10 a preferred embodiment of the angle adjustment unit 24 is described. The angle adjustment unit 24 may comprise two triangular lattice structures 90, 91. Each of the two triangular lattice structures 90, 91 run on rails 93 provided on each of the two frame structures 2, 2'. The rails 93 are arranged along the entire length of the frame constructions 2, 2' or at least on an outer portion (opposite to hinge 23) thereof. The two triangular lattice structures 90, 91 are further hinged in a vertical hinge 92 at a corner of each of the two triangular lattice structures 90, 91. Motors (not shown) or manually operated drive means (not shown) may propel each of the two triangular lattice structures 90, 91 along rails 93 and thereby along the frame constructions 2, 2' to change the angle between the arms 21, 22. Thereby, a very robust and reliable mechanism for changing the angle between the arms 21, 22 is obtained. Further, it is an advantage that this way of constructing the angle adjustment unit 24 secures that when one of the two triangular lattice structures 90, 91 is moved relative to the two frame structure 2, 2', the other of the two triangular lattice structures 90, 91 moves along, thereby reducing the risk of torsion between the arms 21, 22.

A portion 94 of each of the two triangular lattice structures 90, 91 may be provided with fenders or paddings 95, allowing a service vessel to moor at the wave power plant 1. Also, the paddings or fenders 95, will allow a tug boat to push the wave power plant 1 by abutting the fenders 95. Especially, when the arms 21, 22 of the wave power plant are brought close to each other this provides for easy maneuvering of the wave power plant 1.

By an adjustment unit 24 adjusting the angle between the two separate frame constructions of the arms 21, 22 can be adjusted manually or automatically as needed to the effect that the angle can be optimised with a view to obtaining the highest possible output effect or with a view to ensuring against breakdowns in stormy conditions or other. In a not shown alternative wave power plant, the hinge 23 could be replaced by a further linear actuator that could thereby cooperate with the first linear actuator with a view to adjusting and maintaining a desired angle between the two separate frame constructions 21, 22.

Alternatively the angle can be adjusted in that, instead of the linear actuator, a bar-shaped construction is configured with an essentially fixed length, and wherein the bar-shaped construction is, at each end, secured to a carriage, and each of which carriages is arranged such that they can be displaced along the separate frame constructions 21, 22. By shifting the carriages in a direction towards the hinge 23, it is thereby possible to increase the angle between the two separate frame constructions 21, 22, whereas the angle is reduced when the carriages are shifted away from the hinges.

Now referring to FIG. 1 again, an advantageous system for mooring a wave power plant 1 will be described in a further aspect of the invention.

The wave power plant 1 may be connected to a buoy 50 via a mooring line 51. Preferably, the mooring line 51 is a rigid mooring line, e.g. formed in fibre glass, e.g. reinforced fibre glass. Alternatively, the rigid mooring line 51 is formed in steel. The rigid mooring line is preferably hollow to enclose electrical cables (not shown) from the wave power plant 1 to the buoy 50. As seen in FIG. 6, the connection between the mooring line 51 and the wave power plant 1 at the anchoring point 26 only allows the mooring line 51 to rotate in a vertical plane. Thereby, a flexible cable (not shown) may be used to transfer electricity from the anchoring point 26 to the mooring line 51, because the relative movement between the two are restricted to one plane. Alternatively, a sliding electrical contact (not shown) may be provided. Such a sliding electrical contact obviously needs to be contained in a water tight compartment. The connection between the anchoring point 26 and the mooring line 51 being a rotational connection, naturally makes it more complex and expensive to provide a watertight connection. However, with the above described arrangement the task is made easier.

Figure 9:
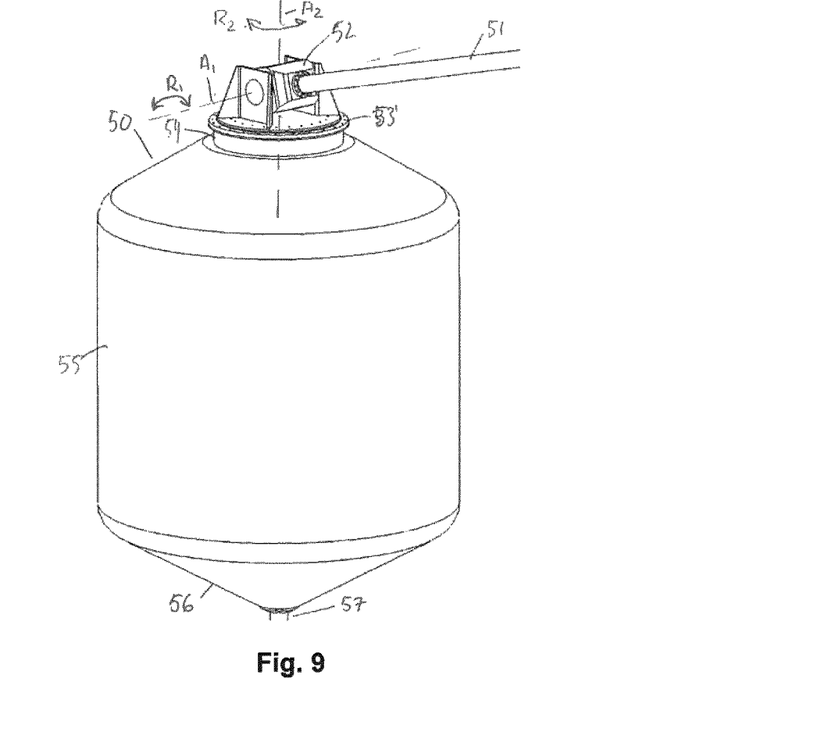
FIG. 9, in a perspective view shows details of a mooring according to an aspect of the invention and for a wave power plant as shown in FIG. 1, the figure showing details of a buoy part of the mooring.

Now referring to FIG. 9, the attachment of the mooring line 51 to the buoy 50 is explained. The mooring line 51 is attached to a first attachment unit 52, which is again attached to a second attachment unit 53. The connection between the mooring line 51 and the first attachment unit 52 is rigid. The second attachment unit 52 is rotationally connected to the second attachment unit 53. However, this rotation $R_1$ is restricted to rotation about a horizontal axis $A_1$, and thus the rigid mooring line 51 and the first attachment unit 52 may only move in a vertical plane relative to the second attachment unit 53. Thus, this connection allows the wave water plant 1 move up and down relative to the buoy 50. Thereby, a flexible cable (not shown) may be used to transfer electricity from the first attachment unit 52 and the second attachment unit 53. Alternatively, a simple version of a water-tight sliding electrical contact (not shown) may be provided by this arrangement. The second attachment unit 53 is rotationally attached to an upper portion 54 of the buoy 50. However, this rotation $R_2$ is restricted to rotation about a vertical axis $A_2$, and thus the second attachment unit 52 may only rotate in a horizontal plane relative to the buoy 50. Thus, this connection allows the wave water plant to change position on the surface of the sea. Thereby, a relatively simple electrical sliding contact may be applied to transfer electricity from the second attachment unit 53 to the buoy 50 by this arrangement. The buoy 50 further comprises a body portion 55. The body portion may be adapted to provide a predetermined buoyancy to maintain the position of the buoy 50 relative to the surface of the water. The buoy 50 may be maintained at a predetermined depth, e.g. at five meters, below the surface. Thereby it is ensured that the buoy 50 is always out of harms way, e.g. during storms. This is referred to as suspension mooring/anchoring. The position of the buoy 50 relative to the water surface may however in a preferred embodiment of this aspect of the invention, be provided in combination with another feature than the buoyancy of the buoy 50, namely by providing a rigid anchor line 57 between the buoy 50 and an anchor 60.

Preferably, the anchor line 57 is a rigid anchor line, e.g. formed in fibre glass, e.g. reinforced fibre glass. Alternatively, the rigid anchor line 57 is formed in steel. The rigid anchor line 57 is preferably hollow to enclose electrical cables (not shown) from the buoy 50 to the anchor 60.

The rigid anchor line 57 is preferably rigidly connected to a bottom portion 56 of the buoy 50. Thus, a simple water tight cable solution may easily be provided between the buoy 50 and the rigid anchor line 57.

Figure 8:
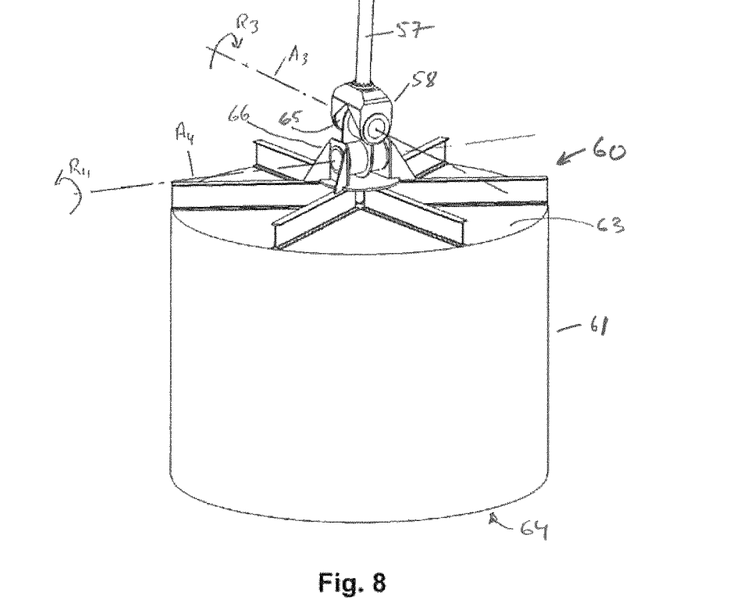
FIG. 8, in a perspective view shows details of a mooring according to an aspect of the invention and for a wave power plant as shown in FIG. 1, the figure showing details of an anchor part of the mooring.

Now referring to FIG. 8 a preferred connection between an anchor 60 and the rigid anchor line 57 is described.

The rigid anchor line 57 is preferably rigidly connected to a first anchor connection unit 48. Thus a simple water tight cable solution may easily be provided between the anchor line 57 and the first anchor connection unit 48.

The first anchor connection unit 48 is connected to a second anchor connection unit 65 which is again connected to a third anchor connection unit 66 which is arranged at an upper portion 63 of an anchor 60.

The connection between the first anchor connection unit 48 and the second anchor connection unit 65 allows rotation of the first anchor connection unit 48 relative to the second anchor connection unit 65. However, this rotation $R_3$ is restricted to rotation about a horizontal axis $A_3$, and thus the rigid anchoring line 57 and the first anchor connection unit 48 may only move in a vertical plane relative to the second attachment unit 65. Thereby, a flexible cable (not shown) may be used to transfer electricity from the first anchor connection unit 48 to the second anchor connection unit 65. Alternatively, a simple version of a water-tight sliding electrical contact (not shown) may be provided by this arrangement The connection between the second anchor connection unit 65 and the third anchor connection unit 66 allows rotation of the second anchor connection unit 65 relative to the third anchor connection unit 66. However, this rotation $R_4$ is restricted to rotation about another horizontal axis $A_4$, which is perpendicular to the horizontal axis $A_3$, and thus the second anchor connection unit 65 may only move in a vertical plane relative to the third attachment unit 66. Thereby, a flexible cable (not shown) may be used to transfer electricity from the second anchor connection unit 65 to the third anchor connection unit 66. Alternatively, a simple version of a water-tight sliding electrical contact (not shown) may be provided by this arrangement.

The connection between the rigid anchoring line 57 and the anchor 60 thus allows the displacement of the buoy 50 relation to the anchor 60 both in the horizontal and in the vertical plane, however without changing the rotational position of the buoy 50, i.e. the buoy 50 cannot rotate about the longitudinal axis of the rigid anchor line 57. Thereby, the above described arrangement reduces the number of complex and expensive electrical connections to a single joint that needs to be able to turn 360°. All other connections may be restricted to a simple back-and forth partly rotational movement, whereby the costs for expensive electrical water-tight connections may be kept at bay.

The anchor 60 may be a simple mooring block, i.e. a solid block of some sorts. However in a preferred embodiment, the anchor is of the suction cup anchor type, where the anchor is formed as an inverted cup, and where the inverted cup is sucked into the bottom (if it is a loose bottom) by (not shown) arrangement in the upper surface 63 of the anchor 60. Thus the bottom 64 is open to allow the suction of the body portion 61 of the anchor to be sucked down into the seafloor. Other types of anchors 60 may be used, depending on the type of seafloor and the size of the wave power plant 1 and the prevailing weather conditions at the location of the wave power plant 1.

In the embodiment shown in FIG. 8, of the suction cup anchor 60, the third attachment unit 66 is attached to the anchor body 61 via a set of I-beams 62 arranged in radial fashion on the top surface 63 of the anchor. When the anchor is sucked into place on the sea bottom, only the star shaped arrangement of I-shaped beams may be visible.

The wave power plant 1 may be connected to an electrical sea cable (not shown) via the above explained connections of the wave power plant 1 to the buoy 50 and the anchor 60. The electrical sea cable may thus be connected to the anchor via not shown means.

Although the teaching of this application has been described in detail for purpose of illustration, it is understood that such detail is solely for that purpose, and variations can be made therein by those skilled in the art without departing from the scope of the teaching of this application.

The term "comprising" as used in the claims does not exclude other elements or steps. The term "a" or "an" as used in the claims does not exclude a plurality. The single processor or other unit may fulfill the functions of several means recited in the claims.

The invention claimed is:

1. A wave power plant comprising:
   a frame construction;
   a plurality of rocking rotors arranged on the frame construction on at least one rotor shaft journaled on the frame construction;
   a drive shaft connected to a generator and journaled in said frame construction; and
   at least one belt drive connection arranged between the rotor shaft and the drive shaft for each rocking rotor,
   at least one rotor drive wheel is arranged on or integrated with each rocking rotor; and
   at least one first shaft drive wheel arranged on the drive shaft for each rocking rotor,
   said belt drive connection comprises a wire or belt portion having a first end connected to the rotor drive wheel and an opposite end connected to the first shaft drive wheel,
   said wire or belt portion being arranged to wind and unwind on the rotor drive wheel and the first shaft drive wheel.

2. A wave power plant according to claim 1, wherein a free-running mechanism is arranged between the first shaft drive wheel and the drive shaft.

3. A wave power plant according to claim 1, wherein two belt drive connections are provided for each rocking rotor.

4. A wave power plant according to claim 3, wherein one wire or belt portion is wound in one direction around a corresponding rotor drive wheel, and where another wire or belt portion is wound in the other direction around a corresponding rotor drive wheel relative to the winding direction of first belt portion.

5. A wave power plant according to claim 4, wherein said second shaft drive wheel is connected to said first shaft drive wheel by a spring mechanism.

6. A wave power plant according to claim 1, wherein a second shaft drive wheel is connected to each first shaft drive wheel, and where a second wire or belt is attached to each second shaft drive wheel by one end of the second wire or belt and to the rotor drive wheel at a second end of the second wire or belt.

7. A wave power plant according to claim 6, wherein said second shaft drive wheel and said first shaft drive wheel are rotational relative to each other.

8. A wave power plant according to claim 7 further comprising
   a free-running mechanism arranged between the first shaft drive wheel and the drive shaft.

9. A wave power plant according to claim 8 wherein said second shaft drive wheel is connected to said first shaft drive wheel by a spring mechanism.

10. A wave power plant according to claim 7 wherein two belt drive connections are provided for each rocking rotor.

11. A wave power plant according to claim 10 wherein said second shaft drive wheel is connected to said first shaft drive wheel by a spring mechanism.

12. A wave power plant according to claim 7 wherein one belt portion is wound in one direction around a corresponding rotor drive wheel, and where another belt portion is wound in the other direction around a corresponding rotor drive wheel relative to the winding direction of the first belt portion and wherein two belt drive connections are provided for each rocking rotor.

13. A wave power plant according to claim 12 wherein said second shaft drive wheel is connected to said first shaft drive wheel by a spring mechanism.

14. A wave power plant according to claim 1, wherein the belt drive connection comprises a belt formed by plurality of wires encapsulated in a mantle.

15. A wave power plant according to claim 14, wherein the mantle is formed in polyurethane.

16. A wave power plant according to claim 1, wherein each of the rocking rotors comprises a substantially cylindrical portion and a tail part, and wherein at least one rotor drive wheel is integrated with the rocking rotor and wherein each rotor drive wheel is formed as a circumferentially running indentation formed in the cylindrical portion and with a hole in the tail part.

17. A wave power plant according to claim 1, wherein said belt drive connection comprises a continuous belt.

18. A wave power plant according to claim 1, wherein the wave power plant is a floating structure, having two arms that can be arranged at an angle to each other, each arm comprising a respective one of said frame constructions with a plurality of rocking rotors, and where the wave power plant comprises a single anchoring point for connecting the wave power plant to a mooring and allowing the wave power plant to sway with respect to a wave direction.

19. A wave power plant of claim 18, wherein the generator of the frame construction of each arm is arranged in a generator housing located centrally on each arm.

20. The combination of a mooring system and the wave power plant of claim 1, the mooring system comprising
an anchor;
a buoy;
a mooring line connecting the wave power plant to the buoy; and
an anchor line for connecting the buoy with the anchor; wherein the anchor line is rigid and connected to the anchor and the buoy such that the buoy is prevented from rotating around a longitudinal axis of the rigid anchor line.

21. The combination of claim 20 wherein the mooring line connecting the wave power plant to the buoy is rigid.

22. The combination of claim 20 wherein rotation of the wave power plant relative to the buoy is allowed only about a single connection provided at the top of said buoy.

23. The combination of claim 20 wherein the buoy is submerged.

24. The combination of claim 20 wherein the wave power plant is a floating structure, having two arms that can be arranged at an angle to each other, each arm comprising a respective one of said frame constructions and a plurality of rocking rotors and where the wave power plant comprise a single anchoring point for connecting the wave power plant to said mooring system and allowing the wave power plant to sway with respect to a wave direction.

25. A rocking rotor for a wave power plant, said rocking rotor comprising a substantially cylindrical portion and a tail part, wherein at least one rotor drive wheel is integrated with the rocking rotor and formed as a circumferentially running indentation formed in the cylindrical portion and with a hole through the tail part.

* * * * *